A. O. HUBBARD.
DRAFT DEVICE OR COUPLING FOR TRAILERS.
APPLICATION FILED NOV. 18, 1915.

1,264,651.

Patented Apr. 30, 1918.
2 SHEETS—SHEET 1.

WITNESSES
M. R. McInnis
E. A. Paul

INVENTOR
ARTHUR O. HUBBARD
BY
Paul & Paul
ATTORNEYS

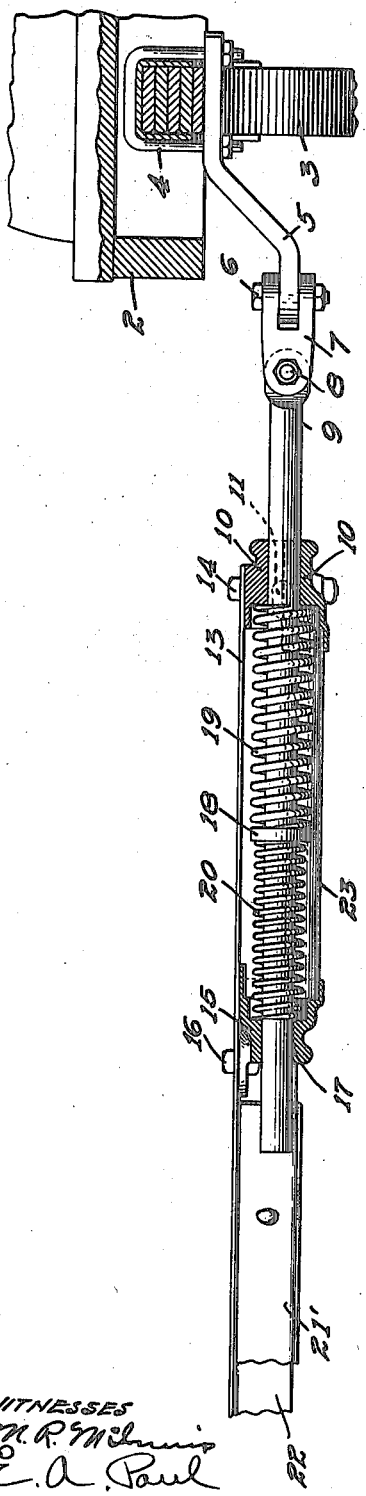

UNITED STATES PATENT OFFICE.

ARTHUR O. HUBBARD, OF MINNEAPOLIS, MINNESOTA, ASSIGNOR TO PUFFER-HUBBARD MANUFACTURING CO., OF MINNEAPOLIS, MINNESOTA, A CORPORATION.

DRAFT DEVICE OR COUPLING FOR TRAILERS.

1,264,651.      Specification of Letters Patent.     Patented Apr. 30, 1918.

Application filed November 18, 1915. Serial No. 62,134.

*To all whom it may concern:*

Be it known that I, ARTHUR O. HUBBARD, citizen of the United States, resident of Minneapolis, county of Hennepin, State of Minnesota, have invented certain new and useful Improvements in Draft Devices or Couplings for Trailers, of which the following is a specification.

The object of my invention is to provide an improved draft connection or coupling between a trailer and the truck or car drawing it to the end that a jerk resulting from the sudden stopping or starting of the power propelled vehicle will be taken up by the draft connection or coupling.

A further object is to provide a draft connection which will allow freedom of oscillation of the tongue vertically or from side to side.

The invention consists generally in various constructions and combinations, all as hereinafter described and particularly pointed out in the claim.

Figure 1:
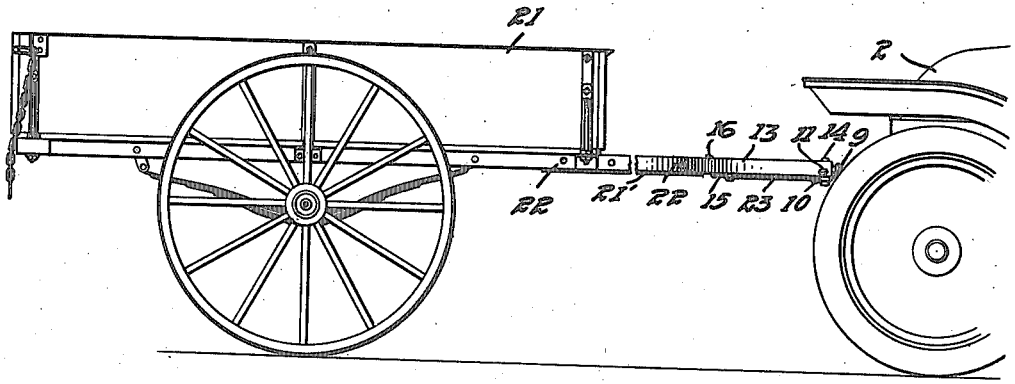
Figure 6:
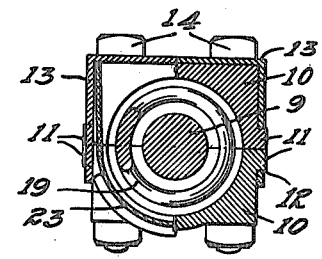
Figure 2:
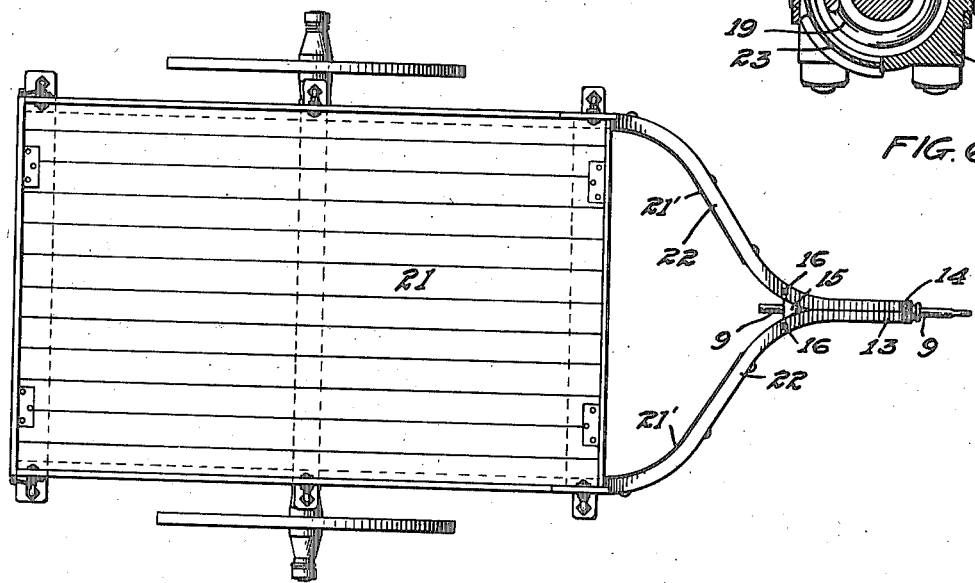

In the accompanying drawings forming part of this specification,

Figure 1 is a side elevation of the rear portion of a vehicle and a trailer attached thereto, Fig. 2 is a plan view of the trailer, Fig. 3 is a detail sectional view of the draft connection, showing the preferred means for connecting it to the vehicle, Fig. 4 is a detail plan view of the same, Fig. 5 is a detail showing the structure of the trailer, Fig. 6 is a sectional view on the line x—x of Fig. 4.

In the drawing, 2 represents the rear portion of a self-propelled vehicle, such as an automobile or truck, having springs 3 and a U-shaped clamp 4 straddling the springs and secured thereto. 5 is a link, mounted at its forward end on the clamp 4 and extending downwardly and backwardly therefrom and having a pivotal connection at 6 with a clevis 7 which in turn is pivoted at 8 to a rod 9. The pivot pins of the connections 6 and 8 are at right angles substantially to one another, so that a universal joint connection is formed between the rod 9 and the link 5.

The rod 9 is slidable in a block composed of sections 10 placed one upon another and having lugs 11 formed thereon to enter openings 12 provided in the vertical flanges of angle bars 13 having their forward ends placed edge to edge in parallel relation on the upper block and secured thereto by a bolt 14. A casting 15 is secured to the angle bars by suitable means, such as bolts 16, and said casting has a socket 17 in which the rear end of the rod 9 is adapted to slide. A collar 18 is mounted on the middle portion of the rod and helical springs 19 and 20, the former preferably stiffer than the latter, are mounted on the rod 9 between the collar 18, the blocks 10 and the casting 17. A trailer 21 has converging angle bar arms 21' at its forward end which are secured to the diverging rear portions 22 of the angle bars 13, thereby bracing and strengthening the rear portions of these bars. The arms 21' when secured to the rear portions 22 of the bars 13 form a bail or draft tongue. A curved guard plate 23 is preferably provided between the blocks 10 and the casting 17 for the purpose of protecting the springs 19 and 20.

When the power operated car is started, the movement will be transmitted to the rod 9 and the spring 19 will be put under compression, yieldingly resisting the forward movement of the rod. Upon stopping the draft vehicle, the momentum of the trailer will carry it forward and through its connection of the draft tongue with the cylinder will put the smaller or weaker spring 20 under compression, thereby compensating for any shock resulting from the sudden stopping of the trailer.

This device can be readily attached to any car or truck and will form a positive means for preventing undue shock or jar to the trailer or the draft vehicle resulting from the sudden stopping or starting of the vehicle.

In various ways the details of construction herein shown and described may be modified and still be within the scope of my invention.

I claim as my invention:

The combination, with a trailer, of bars mounted on the forward portion thereof and forming continuations of the trailer box sills, said bars converging in front of the trailer and merging into a centrally arranged extension thereof, said bars being composed of angle metal, the horizontal and vertical flanges thereof forming the top and side walls of said extension, a draw-rod having bearings in said extension and provided with means concealed by said flanges for yieldingly resisting forward or backward movement of said rod, and the forward end of said rod having means for connection with a vehicle.

In witness whereof, I have hereunto set my hand this 12" day of November, 1915.

ARTHUR O. HUBBARD.